M. CURRAN.
DISH WASHING MACHINE.
APPLICATION FILED DEC. 18, 1908.
936,237.
Patented Oct. 5, 1909.
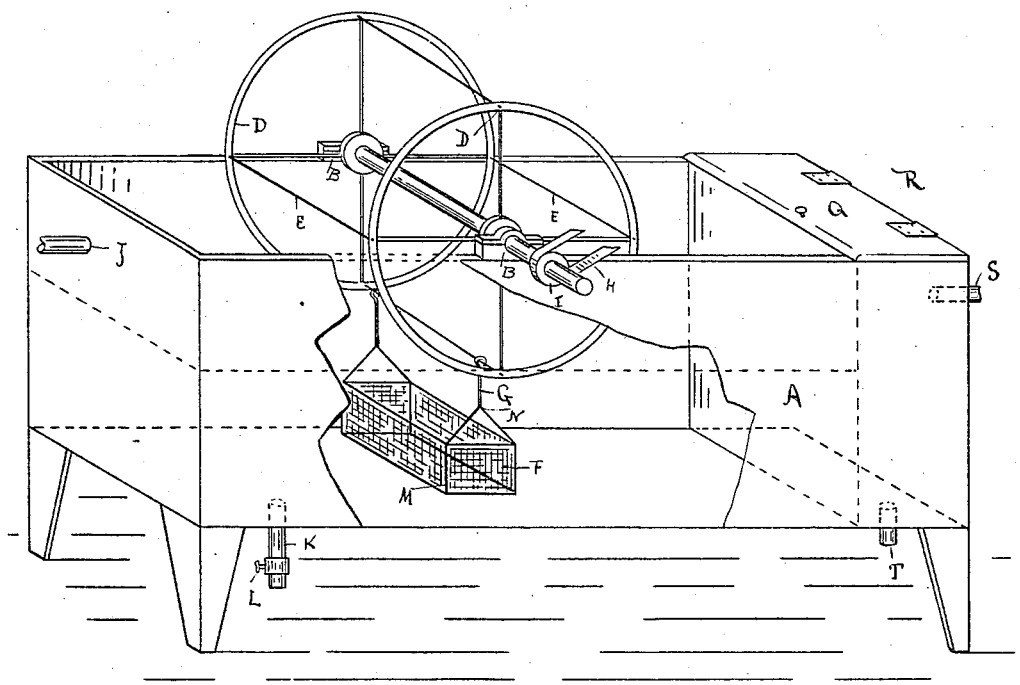
Fig. -1-
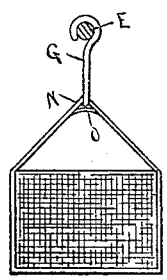
Fig. -2-
WITNESSES—
Charles L. Foster
Marion Richards.
INVENTOR—
Martin Curran
by Clifford & Clifford
Attorneys

UNITED STATES PATENT OFFICE.

MARTIN CURRAN, OF PORTLAND, MAINE, ASSIGNOR TO PERFECTION MANUFACTURING COMPANY, OF PORTLAND, MAINE, A CORPORATION.

DISH-WASHING MACHINE.

936,237.  Specification of Letters Patent.  Patented Oct. 5, 1909.

Application filed December 18, 1908. Serial No. 468,129.

*To all whom it may concern:*

Be it known that I, MARTIN CURRAN, a citizen of the United States, residing at Portland, in the county of Cumberland and State of Maine, have invented a new and useful Dish-Washing Machine, of which the following is a specification.

This invention relates to improvements in dish washing machines and consists in a novel combination of devices whereby a considerable quantity of dishes of various kinds can be readily, conveniently and safely washed at the same time.

It is also designed to combine with said washing machine a drying apparatus whereby the dishes in quantities may be readily, quickly and completely dried.

In the drawings herewith accompanying and forming part of this application, I have illustrated a convenient embodiment of my improvements.

Figure 1 is a perspective view of the machine, portions being broken away and Fig. 2 is an enlarged detail view of the end of the dish holder.

Similar letters of reference indicate like parts in both figures.

In the drawings A is a rectangular tank adapted to be partially filled with water suitably prepared for washing dishes. Mounted in bearings B at the top of the tank is a shaft C carrying wheels D rotating inside of the tank. Between the wheels and secured thereto are a series of transverse bars E. On bars E are mounted dish holders F made of suitable material which will afford a free circulation of water through the sides, end and bottom thereof, preferably of wire mesh. Securely attached to the dish holders are hooks G which are adapted to loosely engage the rods E as shown in Fig. 1. The drum is adapted to have a rotary motion imparted to it in any convenient manner as by a belt H traveling over pulley I and driven by power mechanism not shown. The rotation of the drum lifts the dish holders out of and submerges them again in the water each revolution. The motion of the dish holders with the dishes therein into and out of and through the water serves to thoroughly cleanse the dishes contained therein. The hooks by which the dish holders are supported turn on the rods which support them so that the dish holders are in all positions upright and any movement of the dishes among themselves due to shock or tipping of the dish holders is prevented, thus obviating any breakage of the dishes. The tank may be filled in any convenient manner as from a hot water supply, not shown, though a pipe J and the tank may be emptied through a waste pipe K leading out of the bottom thereof, said pipe J being provided with a stop cock L. The dish holders for convenience are provided at the ends thereof with strong metallic supporting straps M passing around the bottom and sides of the dish holders and brought together at a point some distance above the dish holders as clearly seen at N, Fig. 2, the loop forming a hand hold for handling the dish holders. The hooks are preferably but not necessarily rigidly secured to the straps so that in handling the dish holders the hooks can be readily placed upon or removed from the supporting bars E. To facilitate the handling of the dish holders the apex of the angles may be filled with curved handholds O.

To dry and sterilize the dishes I combine with the dish washing machine a steam tight chest P at one end thereof. This is provided with a cover Q which for convenience should be hinged to the steam tight chest as seen at R and should open away from the rotary drum. It should be of sufficient size to receive a dish holder and it is positioned so that a person standing at the end of the machine can lift the dish holder directly from the rods and insert it in the steam tight chest. Steam or hot air is then introduced into the steam chest through pipe S from a supply not shown. After the dishes are thoroughly dried and sterilized in the steam chest, the cover is again opened and the dish holders and dishes removed. The bottom of the steam chest is provided with a waste pipe T.

Having thus described my invention and its use, I claim:

1. In a dish washing machine, a water containing tank, a rotary drum mounted therein provided with supporting rods extending between the sides thereof and perforated dish holders of wire mesh having supporting arms attached thereto and adapted to be loosely and removably supported on said rods, the dish holders being positioned wholly below the rods, whereby the holders maintain a constant upright position but have a vertical and longitudinal movement through the water in the tank.

2. In a dish washing machine, a water containing tank, a rotary drum mounted therein provided with supporting rods, perforated dish holders of wire mesh provided with upwardly extending arms terminating in hooks adapted to be supported on said rods, means for imparting rotary motion to the drum, whereby the dish holders are loosely and removably supported on said rods and are adapted to have a vertical and longitudinal movement through the water in the tank.

In testimony whereof, I have signed my name to this specification in presence of two subscribing witnesses this fifteenth day of December, 1908.

MARTIN CURRAN.

In presence of—
ELGIN C. VERRILL,
MARION RICHARDS.